US011661143B2

(12) United States Patent
Braedt

(10) Patent No.: US 11,661,143 B2
(45) Date of Patent: May 30, 2023

(54) GEARSHIFT MECHANISM ROLLER

(71) Applicant: SRAM DEUTSCHLAND GmbH, Schweinfurt (DE)

(72) Inventor: Henrik Braedt, Hambach (DE)

(73) Assignee: SRAM DEUTSCHLAND GmbH, Schweinfurt (DE)

(*) Notice: Subject to any disclaimer, the term of this patent is extended or adjusted under 35 U.S.C. 154(b) by 172 days.

(21) Appl. No.: 17/206,678

(22) Filed: Mar. 19, 2021

(65) Prior Publication Data
US 2021/0291932 A1 Sep. 23, 2021

(30) Foreign Application Priority Data

Mar. 23, 2020 (DE) .................. 10 2020 001 877.7

(51) Int. Cl.
B62M 9/126 (2010.01)
F16H 55/30 (2006.01)
(52) U.S. Cl.
CPC ............ *B62M 9/126* (2013.01); *F16H 55/30* (2013.01)
(58) Field of Classification Search
CPC .............................. B62M 9/126; F16H 55/30

USPC .......................................................... 474/78
See application file for complete search history.

(56) References Cited

U.S. PATENT DOCUMENTS

| 4,433,963 | A | * | 2/1984 | Shimano | B62M 9/16 474/134 |
| 5,350,339 | A | * | 9/1994 | Carmichael | B62M 9/126 474/120 |
| 10,823,269 | B2 | | 11/2020 | Nakamura et al. | |
| 2005/0192138 | A1 | * | 9/2005 | Sze | B62M 9/126 474/83 |
| 2017/0259881 | A1 | | 9/2017 | Lazzarin | |

FOREIGN PATENT DOCUMENTS

| CN | 201305106 Y | 9/2009 |
| DE | 102017220921 A1 | 7/2018 |

* cited by examiner

*Primary Examiner* — Gene O Crawford
*Assistant Examiner* — Emily R Kincaid

(57) ABSTRACT

The disclosure relates to a chain roller for a rear bicycle gearshift mechanism. The chain roller comprising a rotatory bearing, a toothed ring with teeth formed thereon, and a support structure which connects the rotary bearing and the toothed ring. The toothed ring and support structure are formed from different materials and are connected to one another radially and axially.

13 Claims, 6 Drawing Sheets

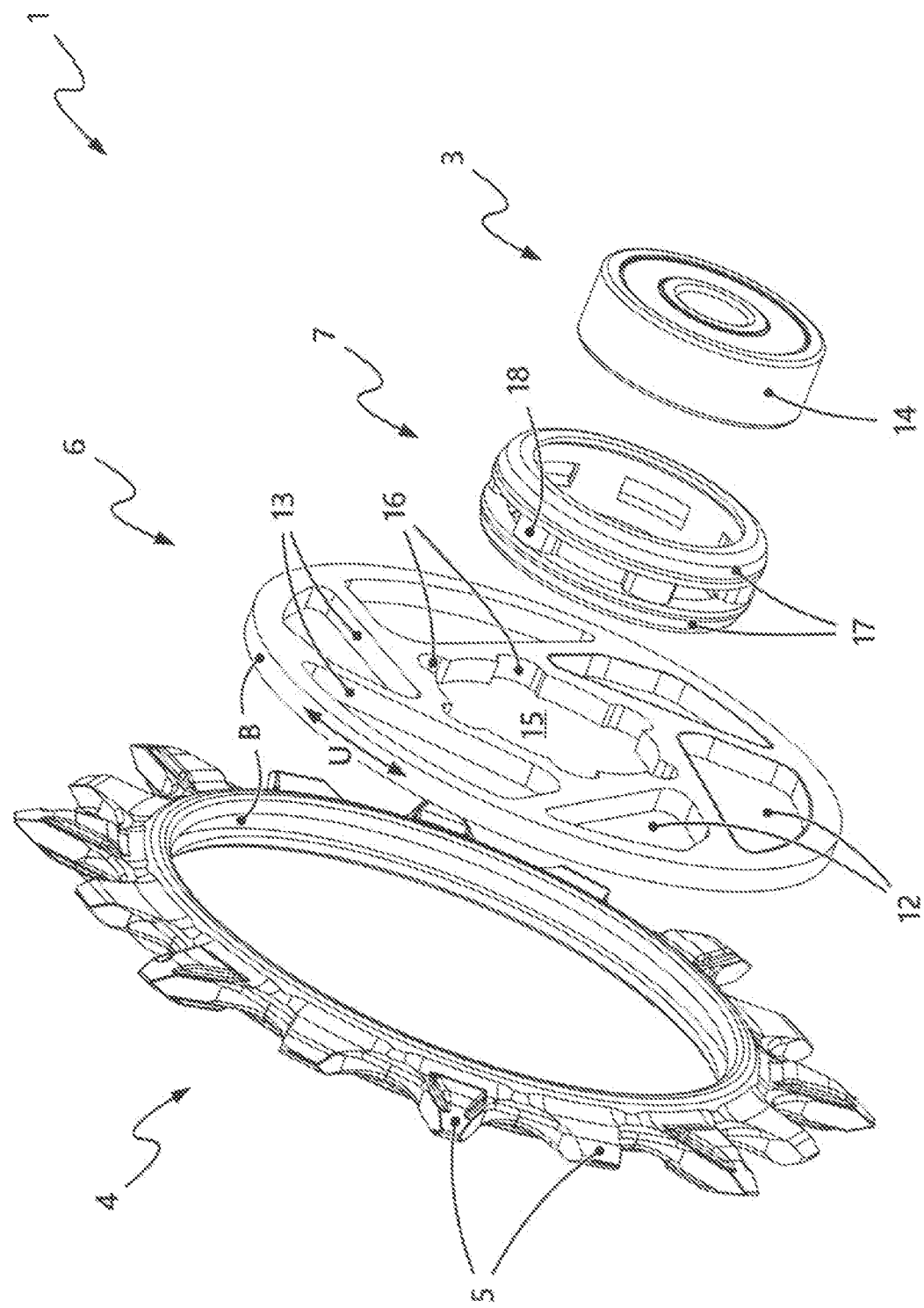

GEARSHIFT MECHANISM ROLLER

PRIORITY

This application priority to, and/or the benefit of, German Patent Application DE 10 2020 001 877.7, filed on Mar. 23, 2020, the contents of which are hereby incorporated by reference in its entirety.

BACKGROUND

Generic chain rollers, hereinafter also referred to as gearshift mechanism rollers, are used in rear bicycle gearshift mechanisms of bicycle derailleurs and, there, are a functional constituent part of the chain cage arrangement, also referred to for simplicity as gearshift mechanism cage or chain cage. The chain cage arrangement of a rear bicycle gearshift mechanism includes an upper chain roller and a lower chain roller, which are commonly arranged between two guide plates of the chain cage.

Generally, the upper chain roller performs the task of guiding the idle strand, which is running onto the pinion assembly, of the chain, in particular for the purposes of exactly controlling the gear change between the various pinions of the pinion assembly. The lower chain roller performs the task of accommodating the excess chain length and the task of introducing the idle strand of the chain into the gearshift mechanism as reliably as possible under all operating conditions.

Conventional gearshift mechanism rollers are normally produced from plastics in the injection moulding process and commonly include ball bearings for low-friction rotatable fastening in the chain cage. The injection moulding process allows inexpensive production of the gearshift mechanism rollers, wherein, in this way, even complex geometries can be formed on the gearshift mechanism roller.

Normally, the ball bearing is overmoulded already during this primary forming of the chain roller and is thus moulded into the chain roller, which saves costs for the generation of a bearing fit and for the installation of the bearing. Gearshift mechanism rollers composed of plastics are also distinguished by high running smoothness. The damping characteristics of the roller material during the radial impacting of the chain links against the roller during operation are decisive for this.

Disadvantages in the case of chain rollers of this type of construction are the low stiffness and the production-induced tolerances resulting from shrinkage processes. These disadvantages come to bear in particular in the case of chain rollers of large diameter.

A further disadvantage of conventional chain rollers composed of plastics results from the substantially massive and often jagged support structure, which however has scarcely any cutouts, between the bearing region and the toothed region of the chain roller. This support structure of conventional chain rollers arises, in terms of construction, from the material characteristics in a manner dependent on the given installation space and the structural requirements.

It has been found that, in adverse weather conditions, sediment and contaminants accumulate in the region of such support structures of conventional chain rollers. This results in increased wear, a reduction in drive efficiency owing to friction, and the risk of complete blockage of the gearshift roller owing to foreign bodies becoming jammed between gearshift mechanism roller and chain cage.

In summary, plastics gearshift rollers produced by injection moulding result in the following disadvantages: (1) Low lateral stiffness; (2) Low precision with regard to pitch circle diameter and lateral runout; (3) Poor self-cleaning function in the case of intense contamination. Disadvantages 1-3 intensify with an increase in diameter of the gearshift roller.

Advantages of such chain rollers are: (1) Low cost; (2) Design freedom for the generation of complex tooth shapes; (3) Low noise emissions.

Alternatively, gearshift mechanism rollers are produced by cutting, wherein use is normally made of aluminium alloys. The considerably greater modulus of elasticity of such aluminium alloys in relation to plastics leads to improved lateral stiffness even in the case of large chain rollers with spoked support structure. Such relatively large chain rollers are becoming increasingly popular not only for reasons relating to the running smoothness and low friction but also for visual reasons.

The pitch circle and lateral runout tolerances that are of importance for the chain engagement can be manufactured very accurately by cutting even in the case of relatively large chain rollers. The precision of chain rollers manufactured in this way assists, in particular in the complex interaction of chain roller, chain and gearshift mechanism cage, for ensuring fault-free operation of the gearshift mechanism in a wide variety of different riding situations.

A disadvantage of chain rollers of this type of construction are the high costs, the manufacturing-induced limitations in the implementation of complex tooth shapes, and the increased noise generation in relation to plastics chain rollers owing to interaction with the chain during riding operation.

A particularly severe disadvantage arises in the case of chain rollers with the actually desired large material cutouts in the spoked support structure. As stated further above, large material cutouts can duly contribute to the self-cleaning action and can also be easily cleaned. It has however been found that, with the size of the cutout, the likelihood of relatively large foreign bodies of corresponding length and thickness (in particular relatively small branches) entering the cutouts and blocking the chain roller also increases. If pedalling is not immediately stopped in such a situation, this can result in a breakaway of the gearshift mechanism, with further consequential damage to the drivetrain and frame.

In summary, the primary disadvantages of milled gearshift mechanism rollers composed of metal are: (1) high costs; (2) restricted design possibilities, in particular in the case of complex tooth geometrie; (3) noise generation; (4) risk of blockage by foreign bodies.

Advantages of such gearshift mechanism rollers composed of metal are: (1) high lateral stiffness; (2) precision; (3) good self-cleaning capability with support structure of open design; (4) technical and visual design freedom.

SUMMARY

According to one aspect of the present disclosure, a chain roller for a rear bicycle gearshift mechanism includes a rotary bearing, a toothed ring with teeth formed thereon, and a support structure which connects the rotary bearing and the toothed ring. The toothed ring and the support structure are formed from different materials and are connected to one another radially and axially in a positively locking fashion.

BRIEF DESCRIPTION OF DRAWINGS

FIG. 4 is an exploded view the chain roller of FIG. 2;

Other aspects and advantages of the embodiments disclosed herein will become apparent upon consideration of the following detailed description, wherein similar or identical structures have similar reference numerals.

DETAILED DESCRIPTION

Figure 1:
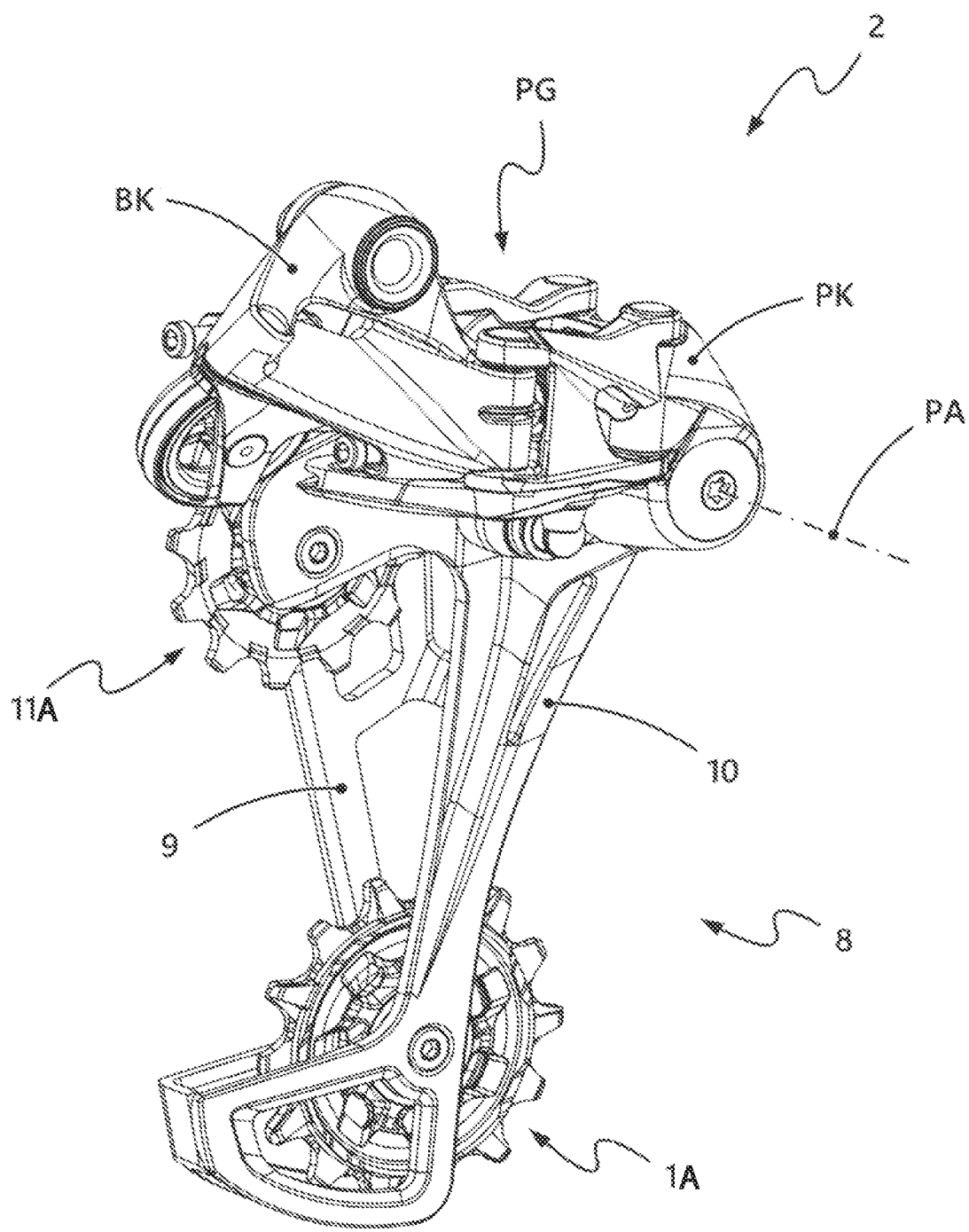
FIG. 1 is a rear bicycle gearshift mechanism according to the prior art.

Proceeding from the background described above, it is therefore the object of the present disclosure to provide a chain roller for a bicycle gearshift mechanism, with which the abovementioned disadvantages are overcome. Here, it is the intention to maintain the advantages of both gearshift mechanism rollers composed of plastic and of those composed of metal.

The object is achieved by a chain roller having the features of the present disclosure.

The chain roller has, in the generic manner, firstly a rotary bearing, a toothed ring with teeth formed thereon, and a support structure which connects the outer ring of the rotary bearing and the toothed ring to one another. The support structure will hereafter also be referred to figuratively as "skeleton". Depending on the field of use and price category, either ball bearings or plain bearings may be used for the rotary bearing.

The chain roller is distinguished by the fact that toothed ring and support structure are composed of different materials, the support structure preferably of metal and the toothed ring preferably of plastics, where the toothed ring and the support structure are connected to one another radially and axially in positively locking fashion.

In this way, the toothed ring can be manufactured, preferably by injection moulding, independently of the support structure of the chain roller with a high level of design freedom and accuracy, and thus ensures optimum and sound-deadening engagement with the chain, whilst the support structure, which is preferably composed of metal, of the chain roller imparts high precision of concentricity, lateral stiffness and self-cleaning capability, and likewise enables a high level of design freedom.

Here, the connection between support structure and toothed ring is of positively locking firm form in a radial direction and in an axial direction but preferably freely or rotationally movable in a circumferential direction in frictionally locking fashion.

Thus, if the support structure or the skeleton of the chain roller becomes blocked relative to the gearshift mechanism cage for example owing to a foreign body, the toothed ring which is driven by way of the chain can continue to rotate relative to the support structure with corresponding frictional moment. In this way, the chain roller is thus provided with an installed overload safeguard, and the damage to the gearshift mechanism and to the drivetrain and even to the bicycle frame, as described above, can be effectively prevented.

The connection between support structure and toothed ring of the chain roller is preferably formed as an overmoulding. For this purpose, the support structure can be placed into the cavity of the injection moulding tool for the toothed ring and then encapsulated or overmoulded with a polymer, whereby the toothed ring is created for the first time. Here, owing to the production by overmoulding of the chain roller skeleton, the toothed ring composed of plastic also attains a high level of precision and precision of concentricity, because the rigid support structure of the skeleton considerably reduces the shrinkage-induced tolerances or changes in shape of the toothed ring.

The chain roller is preferably equipped with a ball bearing, which is preferably likewise connected by overmoulding to the support structure. The connection between the bearing and the support structure is realized by a bearing cage composed of polymer which is overmoulded integrally around an outer ring of the bearing. The bearing cage encompasses both the outer ring of the bearing and an inner recess of the support structure in positively locking fashion, and thus connects the outer ring and support structure fixedly to one another.

The connection between bearing and support structure by the bearing cage overmoulded in this way leads to minimal tolerances, good concentricity and high load capacity of the chain roller. This embodiment can be realized with a plain bearing rather than with a ball bearing.

The support structure is preferably formed as a punched part composed of sheet metal, particularly preferably composed of an aluminium hard alloy. In this way, it is possible to also realize chain rollers with a large diameter, which combine low weight and good concentricity with low noise generation and an appealing appearance.

The present disclosure can be used both for the upper chain roller and for the lower chain roller.

FIG. 1 shows a rear gearshift mechanism 2, known per se, of a bicycle with derailleur. It is possible to see the conventional construction of the gearshift mechanism 2 with the B knuckle BK which is fastenable to the rear frame structure of the bicycle and which is connected via the gearshift mechanism parallelogram PG to the P knuckle PK, which is pivotable laterally for the purposes of gear change.

The gearshift mechanism 2 furthermore has, in a manner which is likewise known, a chain cage arrangement 8. The chain cage arrangement 8 includes an inner guide plate 9 and an outer guide plate 10, an upper chain roller 11A and a lower chain roller 1A.

The chain cage arrangement 8 is pivotable relative to the P knuckle PK about the axis PA of the P knuckle PK and is spring-loaded clockwise by a tensioning spring which is comprised in a known manner in the P knuckle PK, whereby the tension in the chain that is required for the operation of the bicycle drivetrain is generated.

Figure 2:
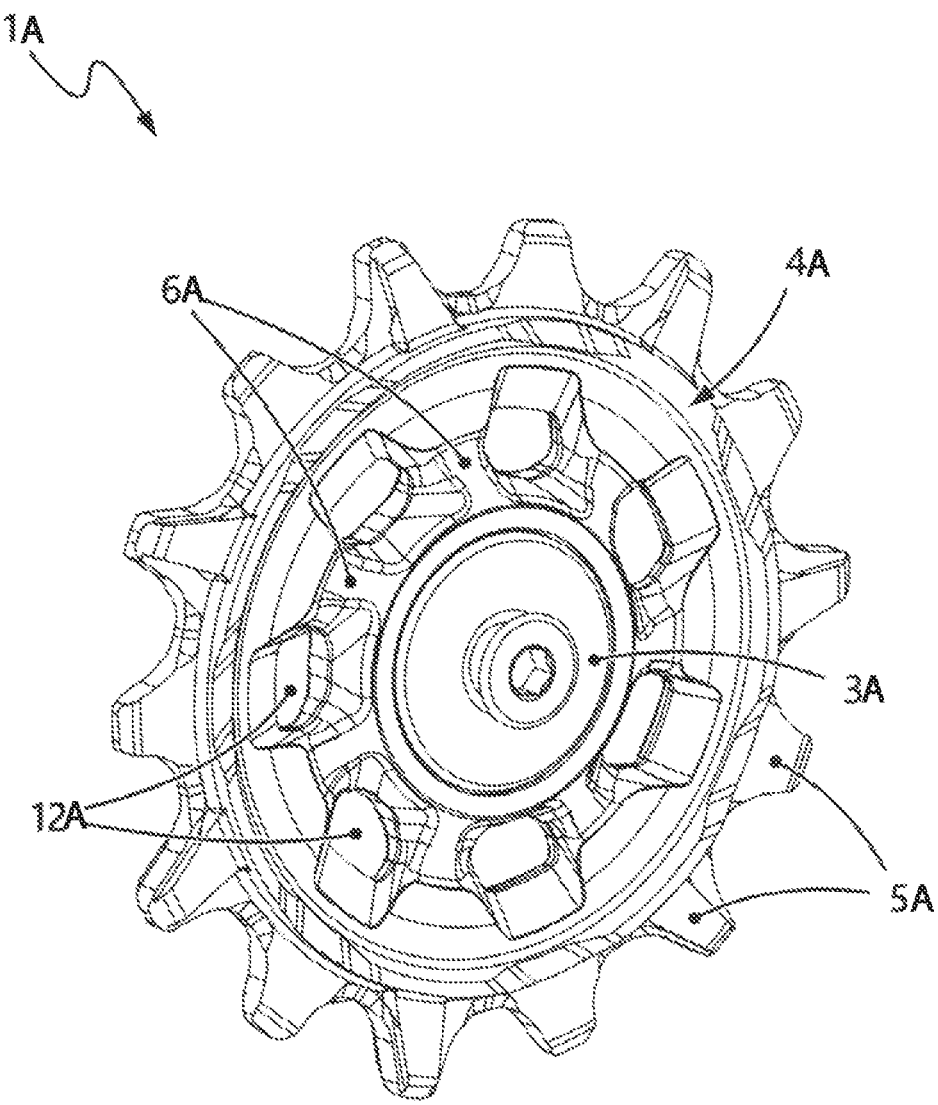
FIG. 2 is a chain roller according to the prior art from the bicycle gearshift mechanism as per FIG. 1.

FIG. 2 shows a lower chain roller 1A of the gearshift mechanism 2 from FIG. 1, wherein the following statements relating to the prior art and to the invention also apply analogously to an upper chain roller 11A of the gearshift mechanism 2 from FIG. 1.

A bearing arrangement 3A is seen arranged radially at the inside, a toothed ring 4A arranged radially at the outside and with teeth 5A formed thereon, and a support structure 6A which connects the bearing, or a bearing outer ring, to the toothed ring 4A. In the case of this chain roller known from the prior art, the toothed ring 4A together with teeth 5A and the support structure 6A are formed integrally as an injection-moulded part.

The disadvantages of this integral form, in particular in the case of chain rollers of relatively large diameter, have been discussed further above in the description of the prior art. These include low lateral stiffness and precision of concentricity, and non-optimal self-cleaning owing to relatively small and at the same time deep and often jagged cutouts 12A, for material and manufacturing reasons, in the region of the support structure 6A.

Figure 3:
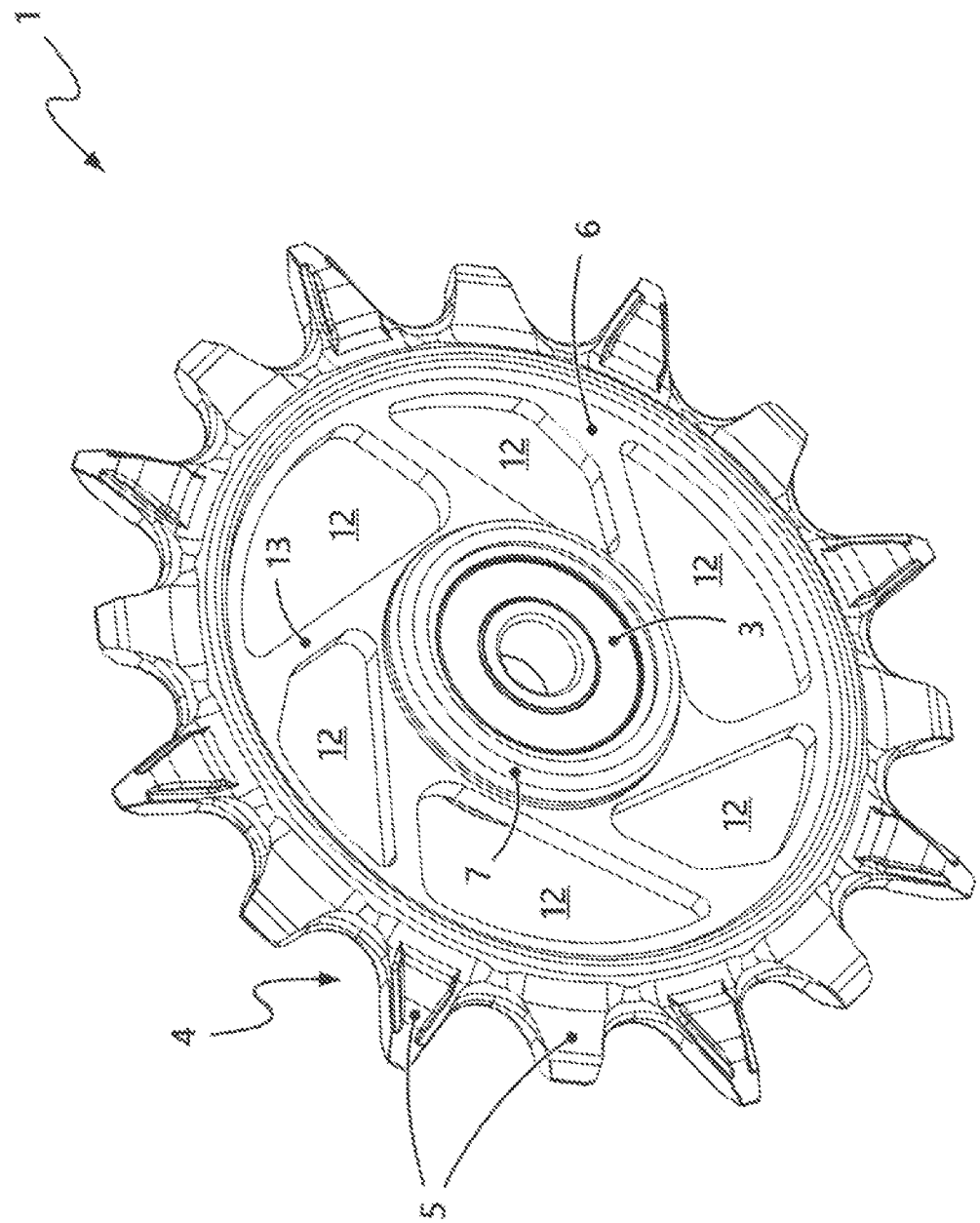
FIG. 3 is a chain roller according to an exemplary embodiment of the disclosure.

FIG. 3 shows an exemplary embodiment for a chain roller 1 according to an embodiment of the present disclosure. The chain roller 1 includes a bearing arrangement, which is designed here as a ball bearing 3, a toothed ring 4 with teeth 5 formed integrally thereon, and a support structure 6 which connects the ball bearing 3 and the toothed ring 4. In the exemplary embodiment illustrated, the support structure 6 has cutouts 12 and spokes 13.

In the oblique view as per FIG. 3, it is also possible to clearly see the complex geometries in the region of the toothed ring 4 with the teeth 5 formed on the toothed ring 4. The geometries include specific tooth shapes with different width for receiving, in dedicated fashion, chain inner link plates or chain outer link plates, and further geometry elements for chain guidance and self-cleaning.

FIG. 4 shows the chain roller 1 as per FIG. 3 in an exploded illustration. It is possible to see the toothed ring 4 with the teeth 5 formed integrally thereon, the support structure or the skeleton 6, and the ball bearing 3. The circular outer region of the skeleton 6 forms, together with a groove which is of positively locking configuration with respect thereto and which is situated on the inner circumference of the toothed ring 4, friction surfaces at B which function as a rotational slipping clutch between the toothed ring 4 and the skeleton 6.

Thus, if the skeleton 6 becomes blocked during riding, for example by foreign bodies, then the toothed ring 4 can, in the event of continued pedalling, continue to rotate about the then stationary skeleton 6, which prevents the severe damage, described in the introduction, to the drivetrain and/or bicycle frame owing to the otherwise impending breakaway of the gearshift mechanism. This advantage comes to bear also in bicycles with an electric additional drive, in the case of which even higher levels of drive power or drive torque tend to act, and in the case of which the electric additional drive possibly does not deactivate quickly enough if a blockage in the drivetrain is identified.

Also illustrated in FIG. 4 is a bearing cage 7, which is formed here as an integral overmoulding. As can be seen when viewed together with FIG. 8, the bearing cage 7 encompasses both the outer ring 14 of the ball bearing 3 and an inner recess 15 of the skeleton 6 in positively locking fashion and thus at least axially fixes the ball bearing firmly relative to the skeleton 6.

The inner recess or bearing fit 15, which serves for receiving the ball bearing 3, of the skeleton 6 has additional recesses 16 at its outer circumference, through which additional recess the bearing cage 7 formed by joint overmoulding of bearing 3 and skeleton 6 engages in positively locking fashion. The recesses 16 fill with plastics during the overmoulding of the bearing 3 and thus form the connecting webs 18 of the bearing cage 7. The bearing cage 7 includes two cage halves 17, which are connected to one another integrally via the connecting webs 18.

In the embodiment illustrated, the skeleton 6 is formed as a simple punched part composed of a high-grade aluminium hard alloy. In this way, it is possible to realize very good manufacturing tolerances at low production costs. At the same time, a high level of design freedom is attained with regard to the spokes 13 and recesses 12 of the skeleton 6. The large recesses 12, which are of prismatic form throughout, of the skeleton 6, also result in good self-cleaning of the chain roller 1. The complex free-form surfaces of the teeth 5 of the toothed ring 4 can in this case be manufactured from plastics in the injection moulding process with high accuracy, independently of the design of the skeleton 6.

During the primary forming of the toothed ring 4, the skeleton 6 is placed into the cavity of the injection mould and is overmoulded by the material of the toothed ring 4. The radial and axial form fit (cf. FIG. 8 at B) between skeleton 6 and toothed ring 4 can thus be produced inexpensively and in accurately fitting fashion. The rotational frictional connection at B between skeleton 6 and toothed ring 4 in the circumferential direction U (cf. FIGS. 7 and 8) is, owing to this process, not dependent on the tolerances of said two components either, but can be optimally set by way of the process parameters during the overmoulding. Owing to the shrinkage of the toothed ring 4 during the cooling after the injection moulding process, the required contact pressure at B between toothed ring 4 and skeleton 6 is provided in order to ensure the desired function of said connection element as overload or slipping clutch.

Figure 6:
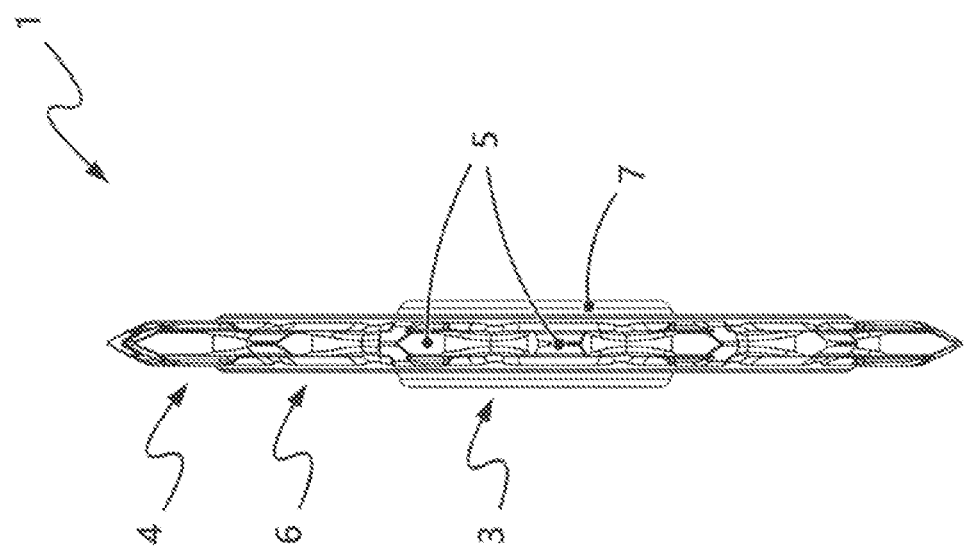
FIG. 6 is a side view of the chain roller of FIG. 3.
Figure 5:
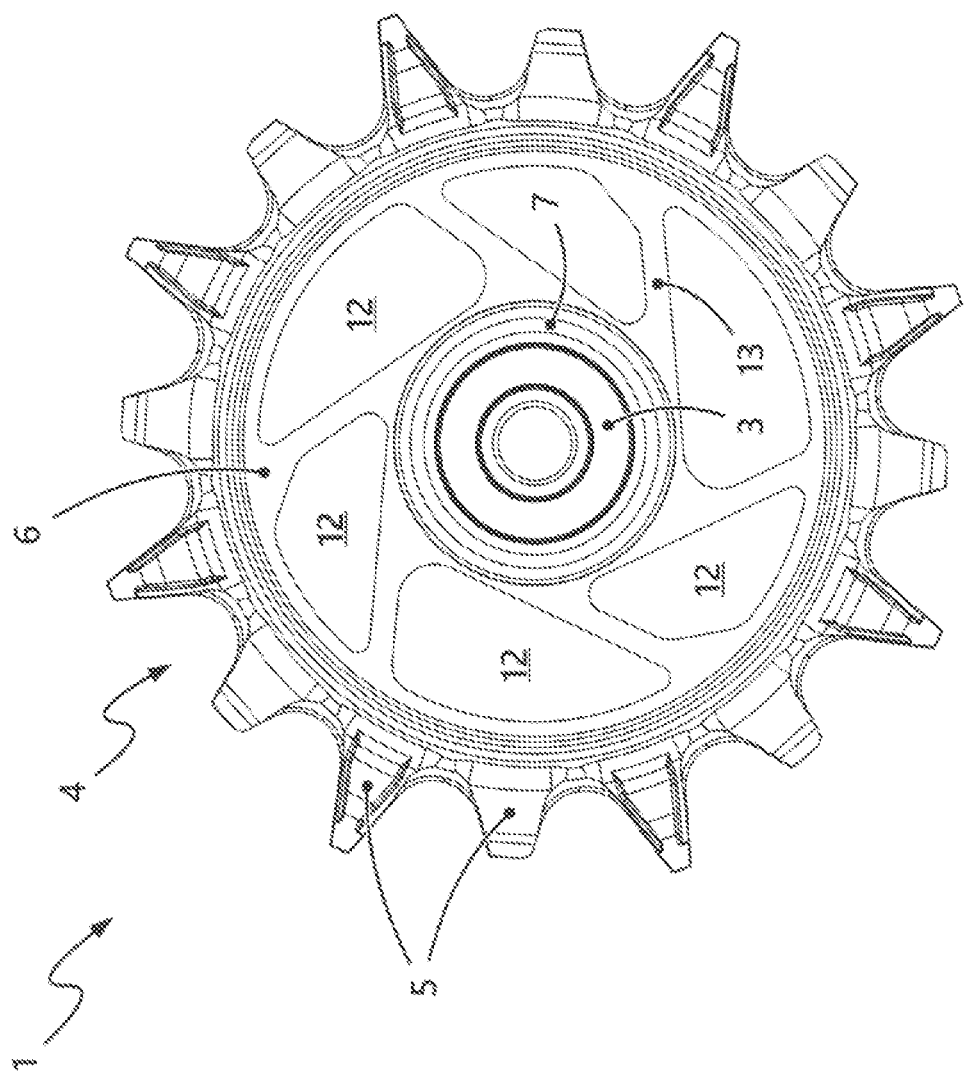
FIG. 5 is a rear view of the chain roller of FIG. 3.

FIGS. 5 and 6 show the chain roller 1 as per FIGS. 3 and 4 in a side view and in a rear view in relation to the installed state on a gearshift mechanism 2 as oriented in FIG. 1, or on a bicycle. It is possible to see the toothed ring 4 with the teeth 5 formed integrally thereon, the support structure or the skeleton 6 with cutouts 12 and spokes 13, the ball bearing 3 and the bearing cage 7 which connects the ball bearing 3 and the skeleton 6.

Figure 8:
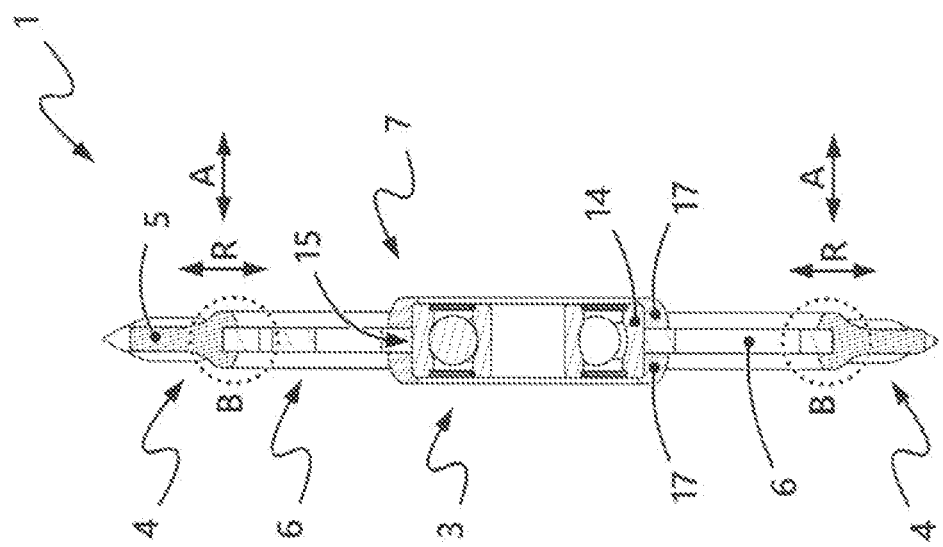
FIG. 8 is a side sectional view of the chain roller of FIG. 3.
Figure 7:
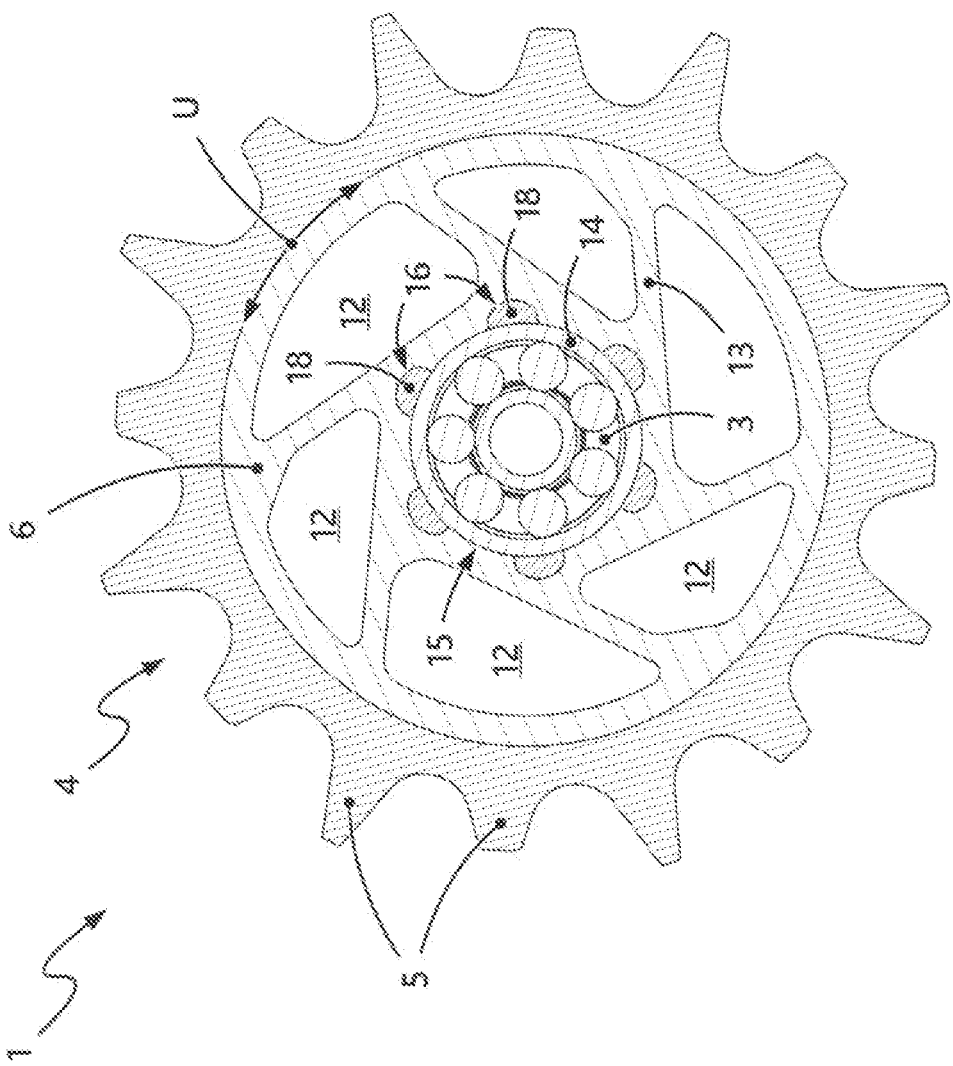
FIG. 7 is a rear sectional view of the chain roller of FIG. 3.

FIGS. 7 and 8 correspond to the views as per FIGS. 5 and 6, but in this case as sectional illustrations. In particular, the connection between skeleton 6 and toothed ring 4 at B can be clearly seen. It can be seen that, owing to the engagement of the skeleton 6 on the inner circumference of the toothed ring 4 in the manner of a groove at B (cf. also FIG. 4), skeleton 6 and toothed ring 4 are firmly connected to one another in the radial direction R and in the axial direction A in positively locking fashion, wherein, at the same time, a connection which is rotationally free but subject to friction owing to the shrinkage of the toothed ring 4 after the injection-moulding process is present between skeleton 6 and toothed ring 4 in the circumferential direction U.

It is likewise possible in FIG. 7 to see the recesses 16 in the region of the bearing fit 15 of the skeleton 6, which recesses are filled and extended through by the webs 18 of the bearing cage 7, cf. also FIG. 4.

The bearing cage 7 includes the two cage halves 17 and the webs 18, is formed by a common overmoulding of the bearing 3 and of the skeleton 6 (cf. FIGS. 3 and 4 and the associated description), hereby encompasses both the outer ring 14 of the bearing 3 and the inner circumference of the skeleton 6 in the region of the bearing fit 15 thereof in positively locking fashion, and thus ensures a firm connection between skeleton 6 and bearing 3.

Bearing cage 7 and toothed ring 4 are preferably produced simultaneously in a single, common tool by simultaneous overmoulding of bearing 3 and skeleton 6, such that optimum concentricity of the chain roller 1 as a whole is attained independently of component tolerances in particular of the skeleton 6.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A chain roller for a rear bicycle gearshift mechanism, the chain roller comprising:
   a rotary bearing,
   a toothed ring with teeth formed thereon, and
   a support structure which connects the rotary bearing and the toothed ring,
   wherein the toothed ring and the support structure are formed from different materials and are connected to one another radially and axially in a positively locking fashion.

2. The chain roller according to claim 1, wherein the toothed ring and the support structure are connected to one another freely rotationally in a circumferential direction by frictional locking.

3. The chain roller according to claim 2, wherein the toothed ring and the support structure include friction surfaces configured to function as a rotational slipping clutch between the toothed ring and the support structure.

4. The chain roller according to claim 2, wherein the connection between the toothed ring and the support structure is formed as an overmoulding.

5. The chain roller according to claim 4, wherein a connection between the rotary bearing and the support structure is formed by a bearing cage.

6. The chain roller according to claim 5, wherein the bearing cage is overmoulded integrally around the rotary bearing and the support structure and which encompasses an outer ring of the rotary bearing and an inner recess of the support structure in a positively locking fashion.

7. The chain roller according to claim 6, wherein bearing cage axially fixes the rotary bearing firmly relative to the support structure.

8. The chain roller according to claim 6, wherein the support structure is formed as a punched part composed of sheet metal.

9. The chain roller according to claim 8, wherein the support structure is formed of hard aluminium.

10. The chain roller of claim 9, wherein the support structure has a plurality of recesses.

11. The chain roller of claim 10, wherein the plurality of recesses includes larger recesses and smaller recesses.

12. The chain roller of claim 11, wherein the smaller recesses are filled with plastic during overmoulding to create connection webs of the bearing cage.

13. The chain roller of claim 10, wherein the support structure has a plurality of spokes.

* * * * *